April 13, 1965 W S HENRION 3,178,658

VOLTAGE-CONTROLLED OSCILLATOR

Filed Feb. 28, 1961 2 Sheets-Sheet 1

INVENTOR.
W S HENRION
BY John E. Wagner
ATTORNEY

INVENTOR.
W S HENRION
BY John E. Wagner
ATTORNEY

United States Patent Office 3,178,658
Patented Apr. 13, 1965

3,178,658
VOLTAGE-CONTROLLED OSCILLATOR

W S Henrion, Reseda, Calif., assignor to The Bendix Corporation, North Hollywood, Calif., a corporation of Delaware Filed Feb. 28, 1961, Ser. No. 92,290
8 Claims. (Cl. 332—14)

This invention relates to FM-FM telemetering systems and, more particularly, to transistor voltage-controlled subcarrier oscillators for such systems.

In a typical FM-FM telemetering system a variable quantity, such as temperature, pressure or acceleration, is converted into an analog signal voltage varying directly with the magnitude of quantity measured and applied to a voltage-controlled subcarrier oscillator to frequency-modulate the output of the oscillator. The frequency-modulated subcarrier waves from several of such oscillators operating at different frequencies and carrying information from different signal sources are combined and applied to the modulator stage of an FM transmitter to frequency-modulate a high-frequency carrier wave which is transmitted. The individual subcarrier signals are recovered at a receiving station and introduced into respective frequency discriminators which reproduce the varying unidirectional signal voltages.

The heart of the transmitter of such a system is the array of subcarrier oscillators, usually free-running transistor multivibrators each of which must accurately convert the input analog signal voltage into a frequency deviation of a subcarrier wave from its selected center frequency or repetition rate. Linear frequency response to the input voltage is essential to the successful operation of the subcarrier oscillators, and their operating frequency and deviation sensitivity must not vary with temperature. The subcarrier oscillators are often located in unfavorable environments, such as on flight vehicles subject to a broad range of temperatures.

Employing advanced packaging techniques, the temperature of the subcarrier oscillators can be maintained within the maximum operating temperature range of silicon transistors under adverse operating conditions. However, changes in temperature within this operating range do produce a change in the center frequency of the oscillator, introducing error. Such errors are intolerable in a system designed to accurately telemeter information.

Heretofore, attempts have been made to stabilize transistor subcarrier oscillators by employing thermistor networks in the base electrode voltage supply circuit in order to change the base voltage as a function of temperature and, thereby, to compensate for the change in the conductance characteristics of the transistor with temperature.

I have now discovered that more effective temperature compensation can be achieved employing the simple addition of a semiconductor diode having similar temperature characteristics to the transistor and connected in the collector voltage supply of the multivibrator. The semiconductor diode exhibits a temperature characteristic more comparable to that of the transistor as compared with thermistors, and the diode is structurally more rugged as well. This latter characteristic is important for oscillators mounted in flight vehicles.

Moreover, I have found that by the use of a resistance network in conjunction with the diode in the collector voltage supply, it is possible to achieve the required temperature compensation to allow the adjustment of the center frequency of operation, and furthermore to independently vary the sensitivity and band width of the oscillator.

These advantages are all achieved in accordance with the invention, one embodiment of which comprises a conventional free-running transistor multivibrator employing a pair of transistors connected in a common emitter configuration with the respective base electrodes of the transistors capacitatively coupled to the collector electrodes of the opposite transistor and a signal input terminal connector through isolating resistors to both base electrodes.

A common voltage supply source is connected through the diode-resistance network of this invention to supply operating voltages to the multivibrator. The collector voltage supply circuit includes two parallel resistance branches in series with a forwardly poled semiconductive diode. One resistance branch includes a potentiometer serving to vary the sensitivity and band width of the oscillator.

The base electrode D.C. current is derived from the potentiometer of the parallel branch. The base supply circuit includes a second potentiometer for controlilng the base current level andt hereby controlling the oscillator frequency.

One feature of this invention relates to the forwardly poled semiconductor diode in the collector voltage supply circuit of a transistor oscillator to obtain temperature compensation.

Another feature of the invention is the connection of variable resistance elements in series in the voltage supply to control the collector and base voltage simultaneously, and thereby sensitivity, without significantly affecting the free-running frequency.

One further feature of the invention relates to a parallel resistance branch connected across the variable resistance element which, in conjunction with the diode, effectively prevents changes in the center frequency when the variable resistance element is adjusted.

These and other features of the invention may be understood more clearly from the following detailed description and by reference to the drawing in which:

FIG. 1 is an electrical schematic representation of a voltage-controlled oscillator incorporating this invention;

FIG. 2*a* is a graphical representation of a typical base voltage waveform of the oscillator of FIG. 1;

FIG. 2*b* is a graphical representation of a typical collector voltage waveform of the oscillator of FIG. 1;

Figure 1:
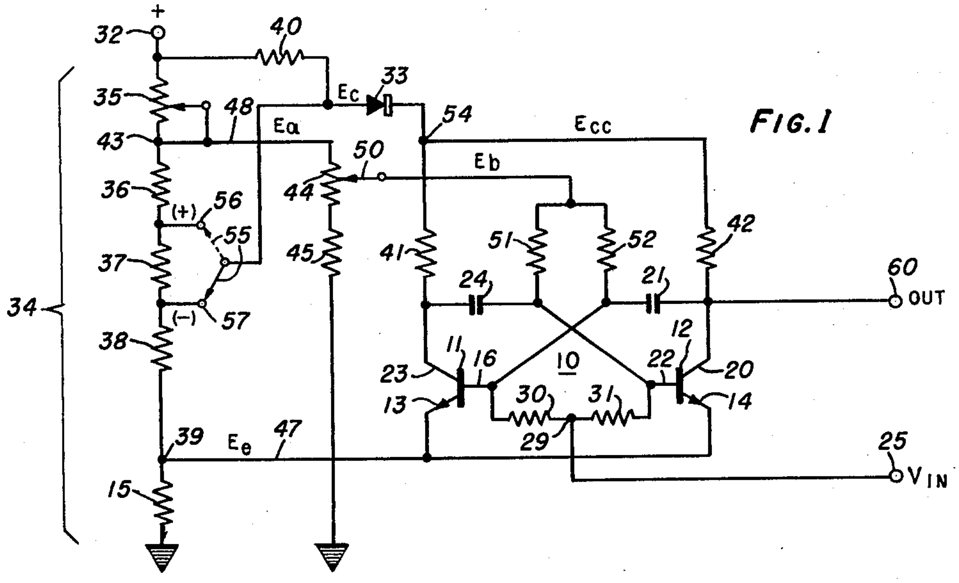

Referring now to FIG. 1, a transistor voltage-controlled multivibrator type oscillator 10 includes as the active elements a pair of transistors 11 and 12. These transistors 11 and 12 have emitter electrodes 13 and 14 connected together and to ground through a resistor 15 in a common emitter configuration.

The base electrode 16 of transistor 11 is cross-coupled to the collector 20 of transistor 12 through a capacitor 21, and the base electrode 22 of transistor 12 is cross-coupled to the collector electrode 23 of transistor 11 through capacitor 24 as in conventional multivibrator practice. A signal input terminal 25 is coupled to both base electrodes 16 and 22 through respective isolating resistors 30 and 31. The terminal 25 is ordinarily connected to the sensor or other signal source which supplies an analog voltage $V_{in}$ varying with the quantity measured. This signal voltage $V_{in}$ is used to vary the frequency of oscillation of the oscillator 10 with a linear frequency deviation.

All operating voltages required for the oscillator 10 are derived from a single source shown in the drawing as voltage supply 32 which, for example, is a 20-volt D.C. supply.

The voltage supply 32 is connected to the oscillator 10 by a resistance network which affords the selection of the collector base and emitter voltage levels, provides for control of both the oscillator center frequency and sensitivity, and in conjunction with a semiconductive diode 33 provides effective temperature compensation for the oscillator. The resistance network includes a voltage divider 34 made up of an adjustable resistance element 35 (the sensitivity and band width control) and fixed resistors 36, 37, 38 and 15. The voltage divider 34 is connected between the supply 32 and ground.

The emitter potential $E_e$ for transistors 11 and 12 is obtained via a first branch conductor 47 tapping the voltage divider 34 at junction 39 between resistors 38 and 15.

The base potential $E_b$ for the transistors 11 and 12 is derived from terminal 43 through a second branch circuit on lead 48. The second branch circuit includes a potentiometer 44 and a fixed resistor 45 in series. The wiper 50 of potentiometer 44 develops the variable base potential $E_b$ from the voltage divider potential $E_a$ at point 43. Potentiometer 44 is used to vary the normal operating or center frequency of the oscillator.

A third branch circuit from the voltage divider 34 at tap 56 or 57 forms the collector voltage $E_{cc}$ supply. This third branch circuit includes a switch 55 selectively connectable to tap 56 or 57 on opposite sides of resistor 37 and a diode 33. The diode 33 is preferably a silicon diode having a forward voltage drop which varies with temperature at a substantially uniform rate. This characteristic is used to temperature-compensate the oscillator. The resistor 37 is also temperature-sensitive and is used for final adjustment of the temperature characteristic of the oscillator as hereinafter described. The remainder of the resistors and capacitors are preferably temperature-stable precision components.

One additional branch circuit to the collector circuit includes a resistor 40 connected between the voltage supply 32 and the anode of diode 33. The output from the oscillator is taken at a terminal 60 connected to the collector 20 of transistor 12.

*Operation*

The operation of the temperature-compensating components and the band width and center frequency controls will become apparent from the following analysis of the normal operation of the oscillator.

Under normal conditions, with the voltage supply 32 connected to the circuit and no signal applied to the input terminal, the following occurs:

At one instant transistor 11 is biased to cut-off, owing to the charge on capacitor 21, and transistor 12 is in saturation with base current flowing through resistor 51 from potentiometer 44, which is the source of base voltage $E_b$.

The charge on capacitor 21 decreases as current flows from $E_b$ through resistor 52 until the base-emitter junction of transistor 11 becomes forward-biased, and rapidly the transistor 11 switches from cut-off to saturated condition.

Figure 2A:
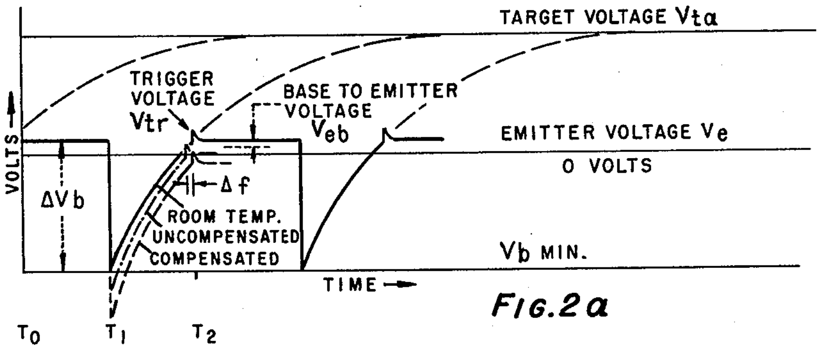

The voltage between the emitter 13 and collector 23 of transistor 11 drops, and the voltages of both electrodes of capacitor 24 and the base electrode 22 of transistor 12 instantaneously follow. Transistor 12 is thereby cut off by the back bias applied by capacitor 24. Charging current flows from $E_b$ through resistor 51 and through resistors 52, 30 and 31 to capacitor 24, charging capacitor 24 and allowing the voltage on base electrode 22 of transistor 12 to rise until it reaches a trigger voltage $V_{tr}$ at which time the two transistors 11 and 12 again change state. The base 22-voltage cycle just described is shown in the solid line of FIG. 2*a*, and is initially slightly above the emitter voltage $V_e$ at time $T_0$ and remaining constant until transistor 11 begins conducting at time $T_1$, whereupon it drops sharply to a minimum value $V_b$ min. and then begins the charge cycle. The slope of the charge curve is a function of the size of capacitor 24 and the currents flowing through resistors 51, 30 and 31. The level at which transistor 12 again becomes conducting appearing at time $T_2$ is termed the trigger voltage $V_{tr}$. With all voltages $E_b$, $V_{tr}$, $V_{in}$ and $V_b$ min. constant, the base voltage follows the repeating cycle shown in FIG. 2*a*. The voltage of the collector electrode 20 of transistor 12 follows the solid line excursions shown in FIG. 2*b*. Under the conditions described above, with no signal $V_{in}$ applied to input electrode 25, the oscillator is free-running at the center frequency determined by the current through resistors 52, 30 and 31, and the size of capacitor 21 for one half cycle, and the current through resistors 51, 30 and 31 and the size of capacitor 24 for the other half cycle.

*Signal modulation*

When an analog signal voltage $V_{in}$ is applied to the input terminal 25, the charge cycles of both base circuits are modified due to the change in current through resistors 30 and 31. When current flows from terminal 25 into the base circuits the charge rate of the capacitors is increased and frequency is increased. If the voltage of terminal 25 falls below that of the junction 29 between resistors 30 and 31, the charging current for the base circuits is decreased. Consequently, greater time is required for the base electrode of the cut-off transistor to reach the trigger voltage $V_{tr}$, and the frequency increases. In this manner the frequency of the oscillator 10 varies with the incoming signal, producing a frequency-modulated output wave.

*Temperature compensation*

When the transistors 11 and 12 are subject to changing ambient temperature, the base-to-emitter voltage $V_{eb}$ changes, and that change is reflected in a change in the level of the trigger voltage $V_{tr}$. As the temperature rises, both $V_{eb}$ and $V_{tr}$ decrease at a rate of a few millivolts per degree centigrade, which in turn causes $V_b$ min. to decrease at the same rate. This causes the voltage difference between the target voltage $V_{ta}$ and the minimum base voltage $V_b$ min. to increase. This in turn causes the slope of the base voltage to increase as shown in the dash-dot line in FIG. 2*a* and the time period for the voltage to reach the trigger voltage to decrease (constituting an increase in frequency, $\Delta f$). One secondary effect of an uncompensated circuit is that the trigger voltage $V_{tr}$ is additionally a function of the beta (the ratio of emitter current to base current) of the transistors, which is temperature-dependent. Changes in beta with increase in temperature cause a further frequency increase.

It is recognized that the change of base voltage swing $\Delta V_b$ is, to a first approximation, equal to the collector voltage swing and that a variation of the collector voltage swing will cause a change in $\Delta V_b$. If the base voltage swing $\Delta V_b$ is caused to increase, the time required for the base voltage $V_b$ to reach the trigger voltage will also increase (i.e., a frequency decrease).

Figure 2B:
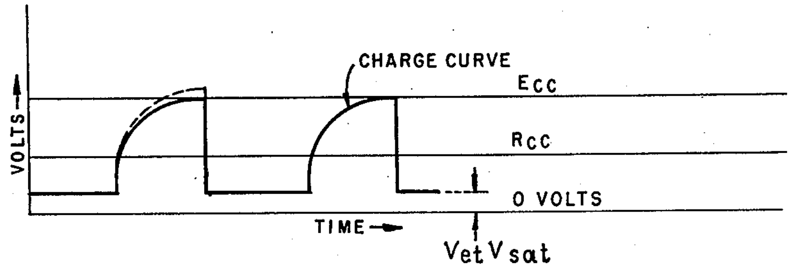
Figure 3:
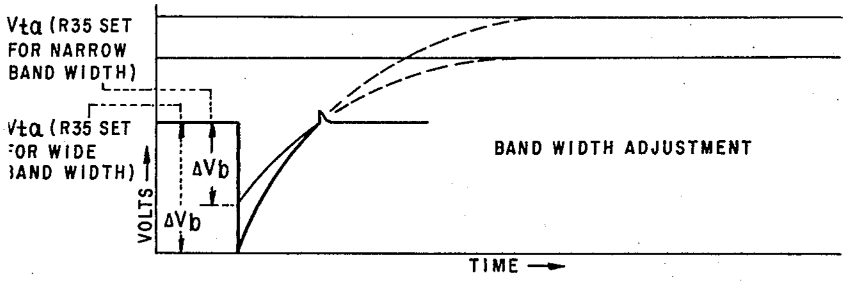
FIG. 3 is a graphical representation of the effect of the sensitivity control upon the waveform of FIG. 2.

Temperature compensation of frequency is accomplished by causing the collector voltage to change as a function of temperature because of the presence of diode 33 in the collector supply circuit. The diode 33 is preferably a semiconductor diode having a forward voltage drop which varies with temperature linearly and at a comparable rate to the temperature change in base voltage $V_{eb}$. Therefore, as the temperature rises the collector voltage rises, increasing the collector voltage swing as illustrated in FIG. 2*b* by the dashed line. The opposite occurs as the temperature decreases. As noted above, this causes the $\Delta V_b$ to change. The over-all effect is that $V_b$ min. is decreased along with the temperature decrease in $V_{eb}$, but the charge curve follows the dashed line to the original triggering time $T_2$. In one typical application employing type 2N703 silicon mesa transistors, a silicon diode type IN 457 provides temperature compensation to within ±5% of the selected center frequency, as compared with ±20% for an uncompensated oscillator. The resistor 37 is temperature-sensitive and is used to complete the temperature compensation. The switch 55 is permanently connected to either point 56 or 57, depending upon whether the residual compensation error is on the positive or negative side. When the diode 33 slightly overcompensates, the jumper 55 is connected to terminal 57 marked (—), and if diode 33 undercompensates, jumper 55 is connected to terminal 56 marked (+).

*Band width adjustment*

In usual applications of subcarrier oscillators of this invention, it is necessary or at least highly desirable that the band width of the output be controlled to meet the signaling system channel frequency deviation limits, e.g. ±7½% or ±15%.

Figure 5A:
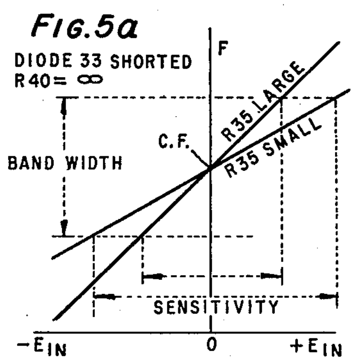
FIGS. 5*a*, 5*b*, 5*c* and 5*d* are graphical representations of the relationship between the band width and the center frequency characteristics of this invention.

Band width adjustment is obtained by use of the adjustable resistance element 35 in the voltage divider 34. Adjustment of resistance 35 varies the voltage $E_a$ from which both the collector voltage $E_{cc}$ and the base voltage $E_b$ are derived. In the absence of resistor 40 and diode 33, voltages $E_b$ and $E_{cc}$ would change by equal percentages when potentiometer 35 is adjusted. Under those conditions an increase in $E_a$ would mean that the contribution of the incoming signal voltage $E_{in}$ to the target voltage $V_{ta}$ would be decreased and the sensitivity of the circuit decreased. This would be true because the target voltage $V_{ta}$ is obtained from the voltage divider made up of resistors 30 and 52 between voltages $E_b$ and $E_{in}$ for transistor 11 and the voltage divider made up of resistor 31 and 51 between the same voltages for transistor 12. A proportionate change in both $E_b$ and $E_{cc}$ with adjustment of resistance 35 would result in no shift of frequency when $E_{in}$ is zero, but a frequency shift would occur at any other level of $E_{in}$. This effect is illustrated in FIG. 5*a*.

With diode 33 present, $E_c$ and $E_b$ still change by equal percentages upon adjustment of resistance 35. However, $E_{cc}$ and $E_b$ change at different proportional rates. $E_{cc}$ will change by a greater percentage than $E_b$. This is true since diode 33, when biased in the forward direction, is the equivalent of a battery and a small series resistor. The fixed voltage of the equivalent battery is subtracted from $E_c$ to obtain $E_{cc}$. At one particular level of input voltage $E_{in}$, the percentage change with adjustment of resistance element 35 of the target voltage $V_{ta}$ is equal to the percentage change in $E_{cc}$ or $\Delta V_b$, and at that level the frequency is independent of the sensitivity adjustment.

Since oscillators preferably have different input signal ranges, the center frequency of the oscillators will occur at different input voltages. To prevent the sensitivity adjustment from affecting the center frequency, resistor 40 is added to the circuit. This is accomplished since resistor 40 by-passes around adjustable resistance element 35 some of the current supplied to the network made up of resistors 36, 37 and 38. This resistor 40 causes $E_{cc}$ to change by a smaller percentage than when resistor 40 was infinity. By proper selection of resistor 40, different input signal voltages are obtained which will produce a frequency which is unaffected by the adjustment of sensitivity control 35. Resistor 40 is usually selected so that this occurs at the center frequency of the oscillator.

Below are tabulated five different combinations of values of resistor 40 and band widths, and the effect upon the oscillator center frequency:

| Signal Current Input in Microamperes | Band Width in Percent Deviation | Resistor 40 in Ohms | Change in Center Frequency with Adjustment of Resistance 35 |
|---|---|---|---|
| 0 to −10 | ±7.5 | (Absent) | None |
| ±10 | ±7.5 | 60K | None |
| ±20 | ±15 | 60K | None |
| 0 to +10 | ±7.5 | 25K | None |
| 0 to +20 | ±15 | 15K | None |

The effect of diode 33 and resistor 40 is also illustrated in FIG. 5. FIG. 5*a* shows the sensitivity-band width relationship of an oscillator without this invention. As illustrated in FIG. 5*a*, diode 33 is shorted, and the branch circuit through resistor 40 is open-circuited or of infinite resistance. In this case there is only one possible center frequency which is independent of the adjustment of the potentiometer 35. That center frequency is determined by the intersection of the two straight lines representing the resistance value of potentiometer 35. The center frequency coincides with a zero-volt input stimulus. The different ranges of sensitivity are indicated in FIG. 5*a*, depending upon the adjustment of the sensitivity control 35. In the circuit illustrated by FIG. 5*a*, there is no temperature compensation. Therefore the center frequency would drift with temperature, and as it moved up or down the ordinate axis, depending upon a temperatu increase or decrease, it woud move from the intersection of the two straight lines, and any adjustment of the sensitivity potentiometer 35 would move the center frequency despite the absence of an input stimulus.

Figure 5C:
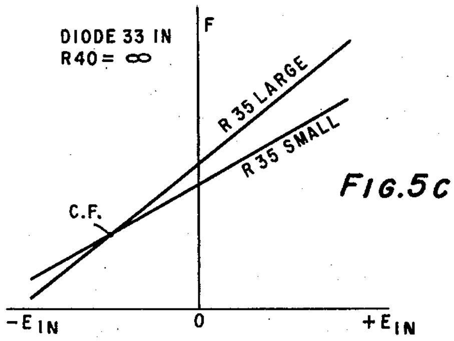
Figure 5B:
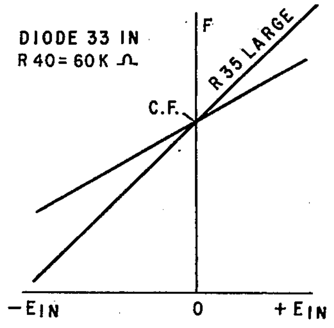
Figure 5D:
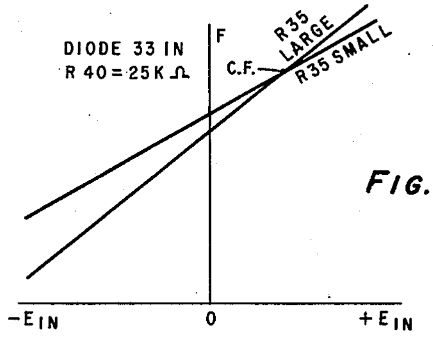

Referring next to FIGS. 5*b*, 5*c* and 5*d*, it is immediately apparent that the intersection of the sensitivity adjustment lines of the potentiometer 35 can have a center frequency at zero stimulus (FIG. 5*b*) at negative voltage input levels (FIG. 5*c*) or at positive voltage input levels (FIG. 5*d*). Therefore, regardless of the range of input signals, whether centered at a negative value, at zero, or positive voltage value, the oscillator may be operated in the required range with the center frequency still independent of the position of the potentiometer 35. This is accomplished by the proper choice of the value of the resistor 40. It should be noted in FIG. 5*c* that with resistor 40 absent, i.e., infinite resistance, the normal operating range for the oscillator is about a negative input level for the center frequency.

In a typical circuit with the resistor 40 at a value of 60,000 ohms and a diode 33 in the circuit, as shown in FIG. 5*b*, the oscillator operates at the center frequency with zero volts at the signal input.

By reducing the value of the resistor 40 to a smaller size, such as 25,000 ohms as shown in FIG. 5*d*, the center frequency at which the oscillator is independent of the position of sensitivity control 35 is moved to a positive voltage level. In each of the three cases of FIG. 5*b*, FIG. 5*c* and FIG. 5*d*, the oscillator is temperature-compensated so that the center frequency remains constant with change in ambient temperature as well, in contrast with the results of FIG. 5*a*.

*Center frequency adjustment*

Figure 4:
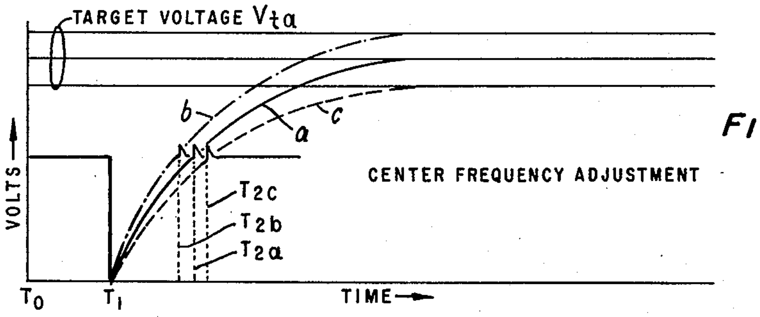
FIG. 4 is a graphical representation of the effect of the frequency control upon the waveform of FIG. 2*a*.

The control of the center frequency of the oscillator is achieved by adjustment of the wiper arm 50 of potentiometer 44. This varies the base voltage $E_b$. The effect of this control is apparent in FIG. 4, in which the solid curve (*a*) indicates the charge curve establishing the normal center frequency with switching taking place at time $T_{2a}$. Adjustment of the wiper 50 so that $E_b$ is higher results in an increase in the target voltage $V_{ta}$ and a sharper rise of the base voltage curve (*b*) shown as the dash-dot line. This charging curve (*b*) reaches the trigger voltage at time $T_{2b}$ earlier than the normal charge curve (*a*), and switching then takes place (increased frequency). When the wiper 50 is adjusted to a lower voltage level, the target voltage $V_{ta}$ is reduced, the charge curve has a slower rise (dashed curve (*c*) in the drawing), and the frequency is decreased with switching occurring at time $T_{2c}$. The center frequency control 50 does not affect the sensitivity of the oscillator, since it merely is used to derive a selected level of the base voltage $V_b$ from a movable tap in a voltage divider of resistors 35, 44 and 45.

*Summary*

It may therefore be seen that my voltage-controlled oscillator has the important characteristics of:

(1) Substantially complete temperature compensation using only a simple semiconductive diode and, when required, a single temperature-sensitive resistor;

(2) Freely adustable band width and center frequency without interaction between the adjustments; and (3) Freedom of choice of input signal voltage level and range being positive, negative or centered at zero volts.

In addition to these characteristics, the oscillator is relatively simple, requiring only one operating voltage, and is small in size. In actual commercial form the oscillator, including additionally a band-pass filter and an amplifier stage, is enclosed in a miniature package assembly weighing approximately 1.5 ounces and having a volume of approximately 1.5 cubic inches.

In a typical oscillator designed for a maximum frequency deviation of ±7½% with input signals ranging from 0 to +5 volts, the following component values are used:

| | |
|---|---|
| Transistors **11** and **12** | Texas Instrument Co. type 2N703. |
| Diode **33** | Hughes Aircraft Co. type IN457. |
| Potentiometers **35** and **44** | 2K ohms. |
| Resistors **36**, **38** | 3K ohms. |
| Resistors **30** and **31** | 1000K ohms. |
| Resistors **51** and **52** | 500K ohms. |
| Resistors **41** and **42** | 15K ohms. |
| Resistor **45** | 18K ohms. |
| Resistor **15** | 100K ohms. |
| Resistor **40** | 15K to infinity. |
| Resistor **37** | Balco type 0 to 1000 ohms. |

Capacitors 21 and 24:

| Center Frequency | Value |
|---|---|
| 400 cps | 0.011 mfd. |
| 1.7 kc | 0.025 mfd. |
| 10.5 kc | 320 mmfd. |
| 70 kc | 60 mmfd. |

Although for the purpose of explaining the invention a particular embodiment thereof has been shown and described, obvious modifications will occur to a person skilled in the art, and I do not desire to be limited to the exact details shown and described.

I claim:

1. A voltage-controlled transistor multivibrator comprising:

a first transistor having base, emitter and collector electrodes;

a second transistor having base, emitter and collector electrodes;

a first frequency-determining network coupling the base of said first transistor to the collector of said second transistor;

a second frequency-determining network coupling the base electrode of said second transistor to the collector of said first transistor;

a source of voltage for powering said multivibrator;

means for deriving operating potentials for said transistors from said voltage source;

said last means including an adjustable resistance element connected to said voltage supply to vary proportionally the potential of the points from which the base and collector voltages are derived;

an input terminal for applying a control voltage to said multivibrator to vary the frequency thereof;

and means partially bypassing said adjustable resistance element between said voltage supply and the collector electrodes of said transistors whereby the potential of said collector electrodes varies at a rate disproportional to the potential of the base electrode of the transistors.

2. The combination in accordance with claim 1 wherein said bypassing means comprises resistance means having a value which determines the frequency at which said multivibrator frequency is insensitive to adjustments of said adjustable element.

3. The combination in accordance with claim 1 wherein said means for deriving collector electrode operating potential includes an impedance element exhibiting a voltage drop relatively independent of applied voltage whereby the potential of the collector electrodes of said transistors varies with adjustment of said adjustable resistance element at a rate differing disproportionally with respect to the rate of the potential of the base electrodes of said transistors whereby the input control voltage level producing no frequency deviation may be selected.

4. The combination in accordance with claim 3 wherein said impedance element comprises a semiconductor diode.

5. The combination in accordance with claim 4 wherein said semiconductor diode has a forward voltage drop characteristic which varies with temperature at a rate substantially equal to the temperature rate of base-emitter voltage drop of said transistors.

6. A temperature-compensated transistor multivibrator comprising:

a first transistor having base, emitter and collector electrodes;

a second transistor having base, emitter and collector electrodes;

a first frequency-determining network coupling the base electrode of said first transistor to the collector electrode of said second transistor;

a second frequency-determining network coupling the base electrode of said second transistor to the collector electrode of said first transistor;

a single source of unidirectional voltage for powering said multivibrator; and means for deriving operating voltages for the base and emitter electrodes of said transistors from said voltage source;

and means for deriving collector electrode potentials for said transistors including a semiconductor diode connected in series between said voltage supply and the collector electrode of said transistors;

said diode being poled to pass current from said voltage supply to said collector electrodes and having a forward voltage drop which varies with temperature at a rate proportional to the variation of the base-emitter voltage of said transistors whereby said semiconductor diode varies the collector voltage with temperature to prevent frequency shifts due to temperature-induced changes in base-emitter voltage of the transistors.

7. The combination in accordance with claim 6 including input terminal means connected to the base electrodes of said transistors for introducing analog voltages to said frequency-determining networks to vary the frequency of said multivibrator and wherein said means for deriving operating potentials from said voltage supply includes a variable resistance element, said variable resistance element being operative to vary proportionally the potential levels from which the base, emitter and collector voltages are derived, thereby to vary the sensitivity of said multivibrator to analog input voltages.

8. The combination in accordance with claim 7 wherein said semiconductor diode in the collector circuit of said transistors is operative to provide a voltage drop between said voltage supply and the collector electrodes of said transistors which is independent of the position of said variable resistance element whereby the analog input voltage at which the operating frequency of the multivibrator is insensitive to adjustments of said sensitivity-adjusting variable resistance element is shifted to a level of opposite polarity from the voltage supply.

References Cited by the Examiner

UNITED STATES PATENTS

| | | | |
|---|---|---|---|
| 2,802,067 | 8/57 | Zawels | 307—88.5 |
| 2,802,071 | 8/57 | Lin | 307—88.5 |
| 2,900,606 | 8/59 | Faulkner | 331—113 |
| 2,964,655 | 12/60 | Mann | 307—88.5 |
| 3,013,220 | 12/61 | Norris | 332—14 |

ROY LAKE, *Primary Examiner*.

L. MILLER ANDRUS, ALFRED L. BRODY, *Examiners*.